V. C. GILPIN.
APPARATUS FOR TESTING TUBES TO DISCOVER OBSTRUCTIONS THEREIN.
APPLICATION FILED MAR. 7, 1911.
1,001,196.
Patented Aug. 22, 1911.
2 SHEETS—SHEET 1.
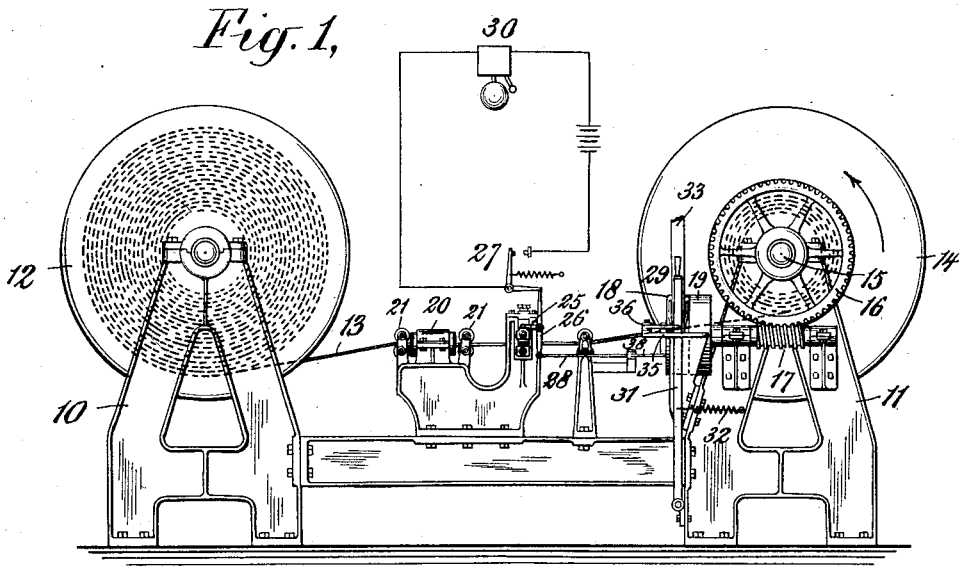
Fig. 1.
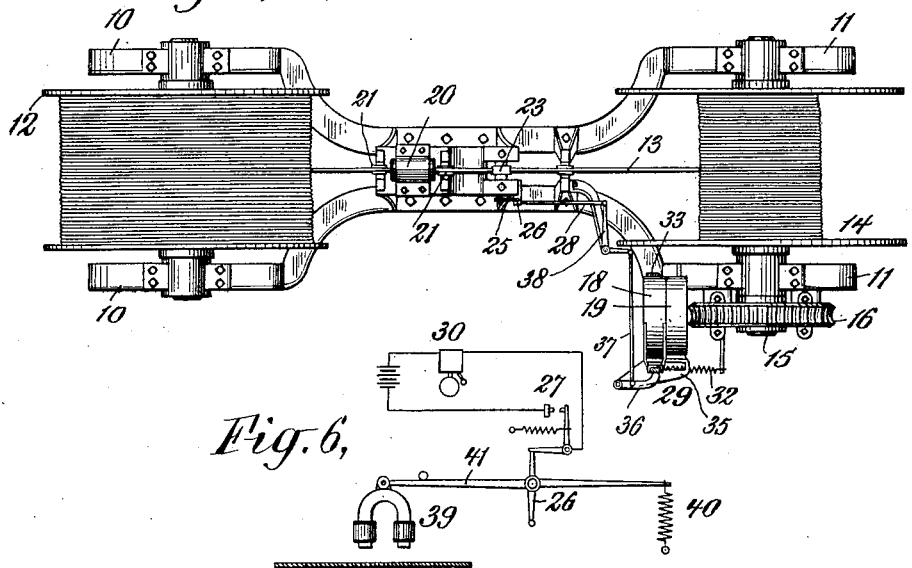
Fig. 2.
Fig. 6.
WITNESSES:
F. B. Graves
Lyman Andrews Jr.
INVENTOR
Victor C. Gilpin
BY
Chapin Wayland
his ATTORNEYS

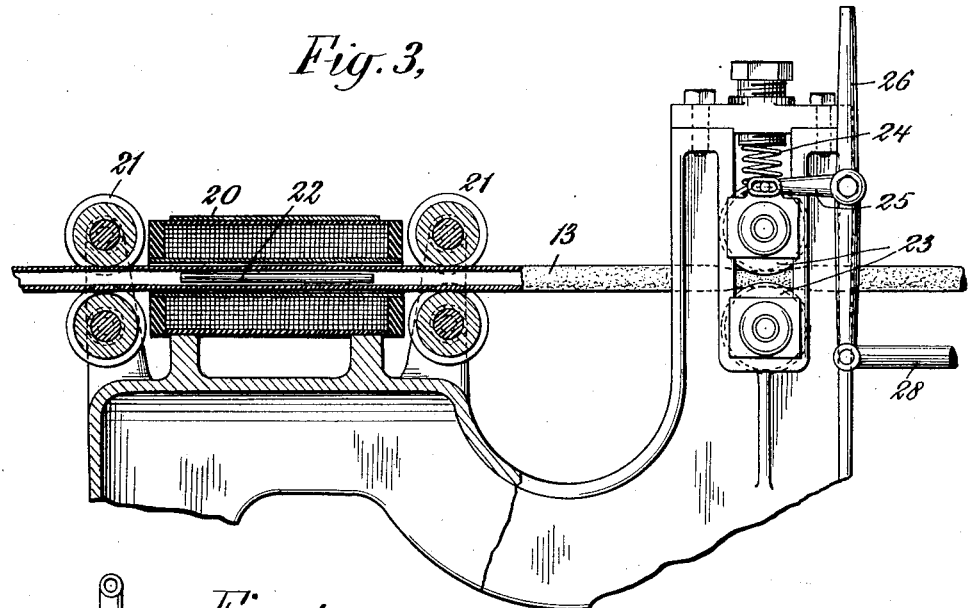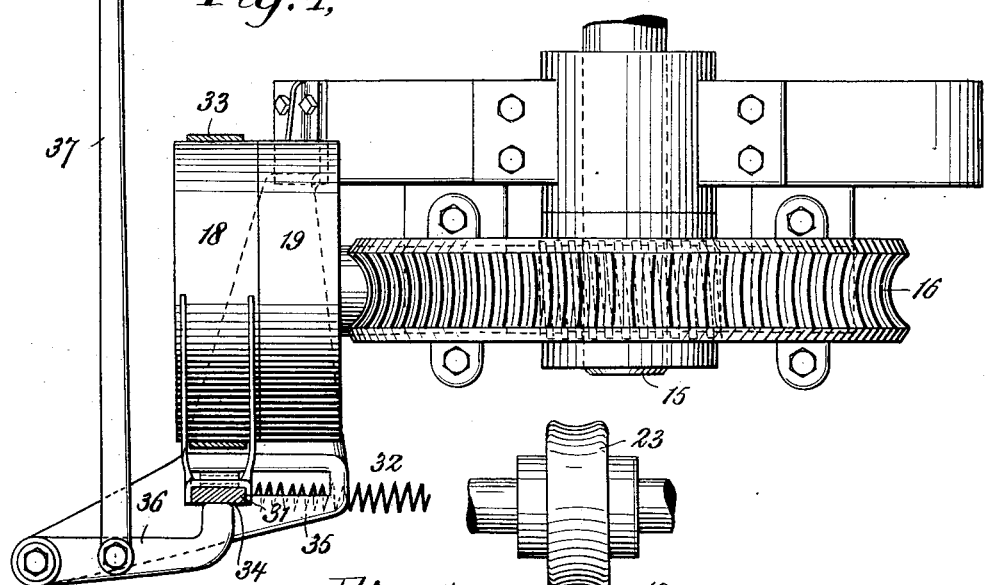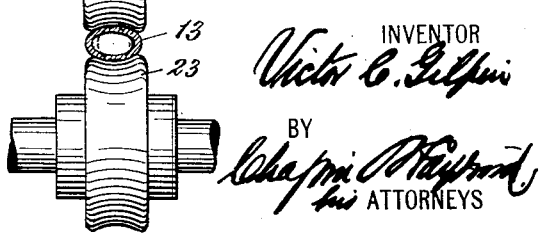

UNITED STATES PATENT OFFICE.

VICTOR C. GILPIN, OF BROOKLYN, NEW YORK, ASSIGNOR TO EASTERN FLEXIBLE CONDUIT COMPANY, OF BROOKLYN, NEW YORK, A CORPORATION OF NEW YORK.

APPARATUS FOR TESTING TUBES TO DISCOVER OBSTRUCTIONS THEREIN.

1,001,196. Specification of Letters Patent. Patented Aug. 22, 1911.

Application filed March 7, 1911. Serial No. 612,873.

*To all whom it may concern:*

Be it known that I, VICTOR C. GILPIN, a citizen of the United States of America, and a resident of Brooklyn, county of Kings, and State of New York, have invented certain new and useful Improvements in Apparatus for Testing Tubes to Discover Obstructions Therein, of which the following is a specification, reference being had to the accompanying drawings, forming a part thereof.

In the manufacture of paper tubes and similar conduits for receiving electric wires, it is common after the manufacture thereof is complete, to test them to see that their interior bore is clear. This is usually done by means of a mechanical device known as a "fishing tool" wherein a piece of metal is passed through the conduit from one end to the other. It will be readily seen that there are many objections to this method of testing conduits; first, it necessitates the fishing tool being of a length not less than the entire length of the conduit to be tested; second, it requires that the entire length of the conduit be maintained in substantially a straight line while the fishing tool is being passed therethrough; and third, the space required for this purpose is about twice the length of the conduit, being equal to the length of the conduit plus the length of the fishing tool.

The main object of my present invention is to overcome these and other objections, and to provide means for testing the conduit in a simple and efficient manner, and I accomplish this by the use of magnetic means arranged exterior to the conduit, and in close proximity thereto, the armature thereof being disposed within the conduit, and means for moving the conduit longitudinally with respect to magnetic means, whereby if the conduit be unobstructed the magnetic lines of force passing through the walls of the tube will hold the armature stationary, but if an obstruction be met the armature will be carried along by the tube away from its magnet.

In connection with the foregoing I also employ a telltale means for determining the point at which the armature meets an obstruction in the conduit, such means including either an alarm mechanism or a stop motion or both, as may be desired.

My invention also consists in many novel details of construction and arrangements of parts as will be pointed out hereinafter, and in order that my invention may be thoroughly understood, I will now proceed to describe an embodiment thereof, having reference to the accompanying drawings illustrating the same, and will then point out the novel features in claims.

In the drawings: Figure 1 is a view in side elevation of an apparatus constructed in accordance with my invention, the electrical connections therefor being shown diagrammatically. Fig. 2 is a top view of the same. Fig. 3 is a view upon an enlarged scale in part side elevation and part central longitudinal section of portions of the apparatus including the magnetic means and the telltale mechanism. Fig. 4 is an enlarged detail top view of a portion of the mechanism included in the stop motion. Fig. 5 is an enlarged detail end view of rollers employed in the telltale mechanism showing a cross sectional elevation of the conduit as being operated upon. Fig. 6 is a detail diagrammatic view of a modified form of the telltale mechanism.

The apparatus illustrated comprises a framework having two sets of standards 10—11, the former arranged for rotatively supporting a pay-off spool 12 carrying a coil of the conduit 13, and the latter supporting a corresponding spool 14 upon which the tested conduit may be rewound. The spindle 15 of the spool 14 is provided with a gear wheel 16, here shown in the form of a worm gear, by which it may be driven, a driving worm 17 being shown in mesh therewith. The driving worm is mounted upon a driving shaft having fast and loose pulleys 18—19 thereon.

Suitably mounted upon the framework intermediate the two sets of standards 10—11 is an electro-magnetic means, here shown in the form of a solenoid electromagnet 20, having a hollow core, and supported in such a position that the conduit will pass longitudinally therethrough. Suitable guide wheels 21—21 are disposed to the front and rear of the said magnet for guiding the conduit (see particularly Fig. 3 of the drawings). The armature 22 for the solenoid is disposed within the conduit and this armature is in the form of a cylindrical bar of such a diameter that it will pass freely through the conduit so long as the same is unobstructed. By reason of this the armature will be held by its magnet 20 as the conduit passes through the magnet, the armature simply hanging back in the same relative position with respect to its magnet as the conduit advances. If, however, there is an obstruction in the conduit such as will prevent a free relative movement of the conduit with respect to the armature, then as the portion of the conduit having the obstruction therein reaches the armature, the armature will be carried along in the further movement of the conduit away from the influence of its magnet. The particular form of electro-magnetic means employed is of course not important, but a solenoid or other form having a balanced magnetic field with respect to an axis corresponding in position to the axis of the tube when in place, is desirable, because the magnetic pull upon the armature in such case is equal in all directions, and a tendency to undue friction between the armature and the inner wall of the tube is thereby avoided. Immediately in front of the magnet is a telltale device for indicating that the armature has been so carried along, and in Figs. 1 to 5 inclusive I have shown one form of such telltale device as follows. A pair of rolls 23 are suitably journaled in a part of the main framework of the machine, the lower roll being stationary and the upper roll spring-pressed toward it by means of springs 24. When the conduit is run through the testing machine it will be in a sufficiently pliable condition so that the pressure of the spring 24 transmitted to the conduit through the rollers 23 will distort the conduit from a cylindrical form to a substantially oval form, as is shown in Fig. 5. This will be merely a temporary condition as the conduit passes between the rollers, the conduit springing back to its original condition as it leaves the said rollers, or if desired or found necessary, means may be provided for thereafter restoring the conduit to its original form. When in its oval condition the minor axis of the conduit will be smaller than the diameter of the armature 22, hence should a portion of the conduit containing the armature be drawn through the rollers, the upper roller will necessarily be lifted against the resistance of its springs 24. Connected to the journal boxes of the upper roller is an arm 25 of a rocking lever 26, the upper end of which normally supports a spring actuated circuit closing device 27, and the lower end of which is in connection through a link 28 with a belt shipping device 29 constituting a stop motion for the drive mechanism of the take-up spool 14. The lifting of the upper roll 21 will have the effect of rocking the lever 26 to a position wherein it will release the circuit closing device 26 to close circuit through a signaling device 30 and wherein it will likewise operate the stop motion to shift the belt from the fast pulley 18 to the loose pulley 19. This stop motion may be of any desired form, being *per se* no part of my present invention. In the drawings I have shown a conventional form thereof comprising a pivoted belt shipping lever 31 normally under the tension of a spring 32, to move from a position wherein it will hold the belt 33 upon the fast pulley 18, to a position wherein it will hold the belt upon the loose pulley 19. Normally this belt shipping lever rests in a notch 34 in a plate 25, and it is released from said notch, so that it may move to the right as shown in the drawings, under the influence of the spring 32 by means of a pivoted arm 36 connected by means of a link 37 with one arm of a bell crank lever 38, the other arm of which is connected to the link 28.

From the foregoing it will be seen that so long as the conduit is unobstructed it may be wound up upon the spool 14, being paid off from the spool 12 for this purpose, but that should there be an obstruction therein, such obstruction upon meeting the armature of the electro-magnetic device will cause the armature to be carried along with the conduit and will operate the telltale mechanism either to stop further travel of the conduit or to indicate to an operator that an obstruction has been reached, or both.

A modification of the telltale device is shown in Fig. 6 wherein another electro-magnet 39 is located in proximity to the conduit forward of the solenoid magnet 20. Should the armature leave the solenoid 20 and travel beneath the electro-magnet 39 it will cause the electro-magnet to move down against the resistance of a light spring 40, rocking the carrying lever 41 to which the rocking lever 26 is connected, thereby releasing the circuit closing device 27 and operating the stop motion in the manner above described.

The class of conduits for the testing of which my apparatus is particularly designed, is that made and sold by the Eastern Flexible Conduit Company. These conduits are made of paper and are flexible in the sense that they may be readily wound and unwound from spools. They are also resilient to a certain extent and they are particularly resilient and flexible just after they are made and while still heated. It is while in this condition that they may be readily distorted by the spring 24 and rolls 23, readily regaining their cylindrical form after the distorting pressure has been relieved therefrom.

What I claim is:

1. Apparatus for detecting obstructions in tubes comprising a magnet disposed at the exterior of the tube, the magnetic field of the said magnet being balanced with respect to an axis corresponding in position to the axis of the tube being operated upon, an armature therefor arranged within the tube, and means for moving the tube longitudinally past the magnet.

2. Apparatus for detecting obstructions in tubes comprising a hollow magnet arranged to surround the tube, means for drawing the tube through the magnet, and an armature for the said magnet arranged loosely within the tube.

3. In apparatus for detecting obstructions in tubes, the combination with a magnet disposed at the exterior of the tube, an armature therefor arranged within the tube, and means for moving the tube longitudinally past the magnet, the magnetic lines of force passing through the walls of the tube from the said magnet normally attracting the said armature and holding it against movement with the tube as the latter moves longitudinally, of a telltale for so indicating should the armature be carried along with the tube.

4. In apparatus for detecting obstructions in tubes, the combination with a hollow magnet, means for drawing a tube longitudinally through the magnet, and an armature for the magnet arranged to lie loosely within the tube, and to be normally held by the magnet against longitudinal movement with the tube as the latter moves, of a telltale for so indicating should the armature be carried along with the tube.

5. In apparatus for detecting obstructions in tubes, the combination with a magnet disposed at the exterior of the tube, an armature therefor arranged within the tube, and means for moving the tube longitudinally past the magnet, the magnetic lines of force passing through the walls of the tube from the said magnet normally attracting the said armature and holding it against movement with the tube as the latter moves longitudinally, of a stop-motion for stopping the said tube moving means should the armature be carried along with the tube.

6. In apparatus for detecting obstructions in tubes, the combination with a hollow magnet, means for drawing a tube longitudinally through the magnet, and an armature for the magnet arranged to lie loosely within the tube, and to be normally held by the magnet against longitudinal movement with the tube as the latter moves, of a stop-motion for stopping further tube drawing operation should the armature be carried along with the tube.

7. In apparatus for detecting obstructions in tubes, the combination with a magnet disposed at the exterior of the tube, an armature therefor arranged within the tube, and means for moving the tube longitudinally past the magnet, the magnetic lines of force passing through the walls of the tube from the said magnet normally attracting the said armature and holding it against movement with the tube as the latter moves longitudinally, of a telltale including yielding pressure means located in front of the said magnet for distorting the tube after it has left the magnet.

8. In apparatus for detecting obstructions in tubes, the combination with a hollow magnet, means for drawing a tube longitudinally through the magnet, and an armature for the magnet arranged to lie loosely within the tube, and to be normally held by the magnet against longitudinal movement with the tube as the latter moves, of a telltale including yielding pressure means located in front of the said magnet, for distorting the tube after it has left the magnet.

VICTOR C. GILPIN.

Witnesses:
D. Howard Haywood,
Lyman S. Andrews, Jr.

Copies of this patent may be obtained for five cents each, by addressing the "Commissioner of Patents, Washington, D. C."